United States Patent Office 2,955,729
Patented Oct. 11, 1960

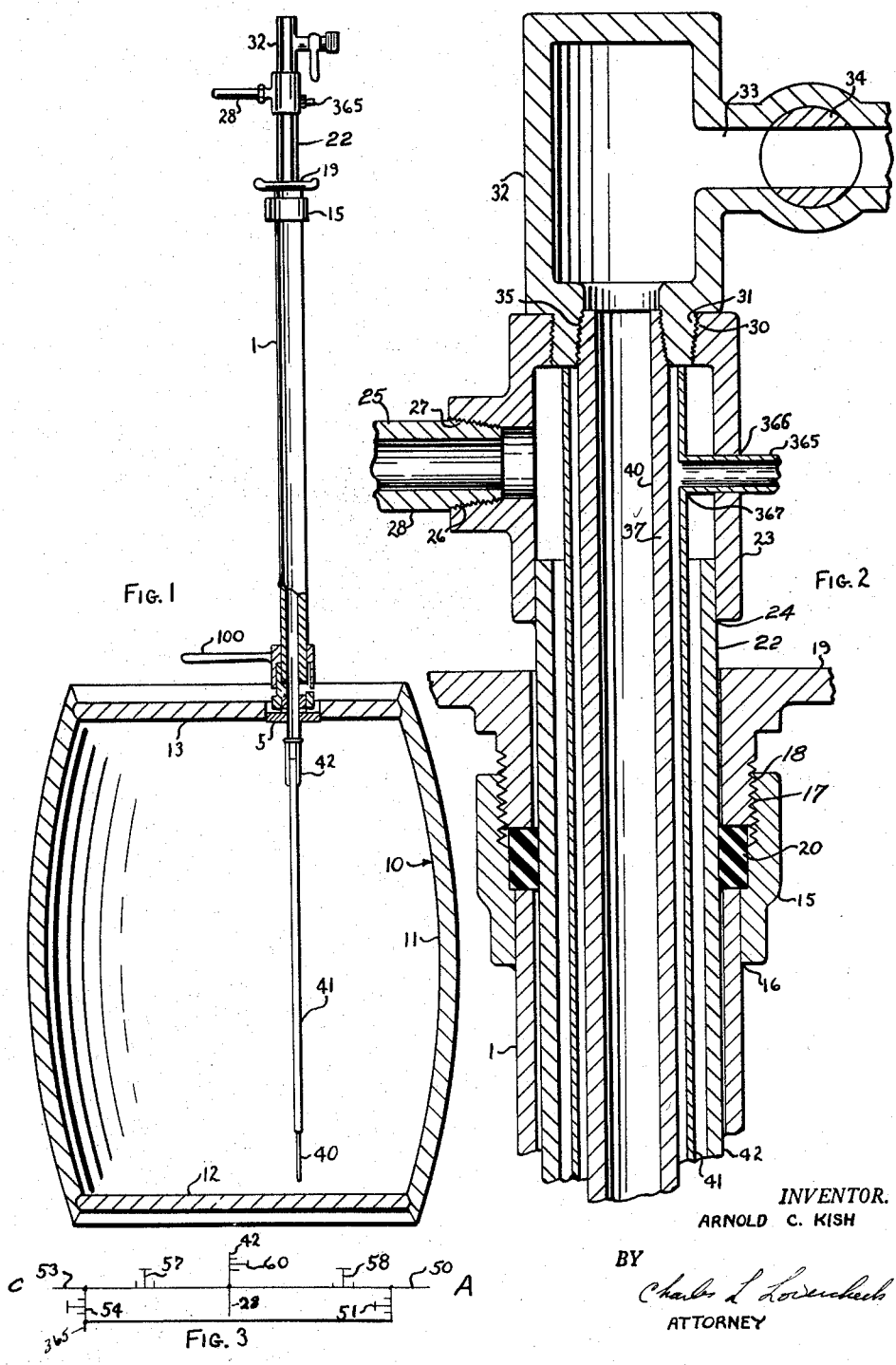

2,955,729

BEVERAGE DISPENSING DEVICE

Arnold C. Kish, 1037 W. 25th St., Erie, Pa.

Filed Feb. 28, 1957, Ser. No. 642,984

4 Claims. (Cl. 222—400.7)

This invention relates to beverage dispensing devices and, more particularly, to devices for dispensing carbonated beverages such as beer.

In the dispensing of carbonated beverages such as beer from bulk containers such as kegs where the beverage is allowed to stand in the kegs for an extended period of time after they have been opened, it is common knowledge that the beverage gives up some of the $CO_2$ gas dissolved therein and thus eliminates the carbonic acid from the beverage. The beverage, therefore, takes on a flat taste. On the other hand, if the beverage contains an excessive amount of dissolved $CO_2$, it will have the characteristic commonly known as "wild"; that is, as soon as the beverage is dispensed from the tap, the $CO_2$ will expand and excessive foaming will result.

Various means for solving the above problems have been proposed. It was commonly believed that the air compressed above the beverage in the container for dispensing purposes absorbed the $CO_2$ from the beverage and, therefore, reduced the $CO_2$ content of the beverage. The present inventor has discovered that the amount of $CO_2$ absorbed in the air above the beverage is much less than the total amount of $CO_2$ lost. Therefore, he has concluded that the $CO_2$ lost from the beverage and not absorbed escapes out of the tap when beer is dispensed.

To replenish the $CO_2$ and insure that an optimum amount of $CO_2$ is dissolved in the beverage at all times, the present invention provides a means for utilizing selectively either air or $CO_2$ as a compressing medium above the beverage so that the proper balance of dissolved $CO_2$ can be maintained in the beverage and if the $CO_2$ content of the beverage becomes low, the atmosphere above the beverage can be changed to a high percentage of $CO_2$. Conversely, if the percentage of $CO_2$ in the beverage becomes too high and the beverage becomes wild, $CO_2$ can be bled from the container and air admitted above to dilute the $CO_2$. Means are provided for bleeding off the atmosphere above the beverage at all times in order to change it to a different proportion of air. Further, a means is provided to admit the compressing gas at the bottom of the container so that it bubbles up through the beverage and, in the case of air, the air bubbling up through the beverage will absorb $CO_2$ from the beverage. In the case of $CO_2$ bubbling up through the beverage, an additional amount of $CO_2$ will be dissolved in the beverage.

With the above in view, it is, specifically, an object of this invention to provide a means of dispensing beverage and maintaining an optimum $CO_2$ balance in the beverage wherein the dispensing means is simple in construction, economical to manufacture, and simple and efficient to use.

Another object of the invention is to provide a beverage dispensing device wherein one of two gases may be selectively put into a container, either above the beverage or applied at the bottom of the beverage and bubbled up through the beverage.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a cross sectional view of a beverage dispensing device attached to a container and the container in front of the dispensing device being shown in cross section;

Fig. 2 is a cross sectional view of part of the device shown in Fig. 1; and

Fig. 3 is a schematic piping diagram of the valve arrangement of the device for admitting $CO_2$ to the beverage.

Now with more specific reference to the drawing, a beverage container 10 is shown having a dispensing device 1 attached at 100 and disposed through a bung 5 in the usual manner. The container 10 has sides 11, a bottom 12, and a top 13 assembled in the usual manner with the bung 5 at the top thereof. The dispensing device 1 is primarily made up of three concentric tubes 40, 41, and 42, all concentrically arranged to each other. The tube 40 extends downwardly and terminates adjacent the bottom of the container 10. The upper end of the tube 40 threadably engages an upper head 32 at 35. A pipe 33 communicates with the head 32 and a shut-off valve 34 is provided to shut off the flow of beverage from the tube 40 through the upper head 32 through the shut-off valve 34. A dispensing valve of the usual kind can be attached to the pipe 33.

The tube 41 is disposed concentrically around the tube 40. The tube 41 terminates at its upper end against the head 32 and provides a space therebetween for the admission of gas through an inlet 365 which is sealingly attached to the tube 41 at 367 and is sealingly attached to a head 23 at 366. The head 23 is threadably and sealingly attached to the external threads on the head 32 at 31 by means of threads 30.

The tube 42 is concentric to and disposed around and spaced from the tube 41 and terminates adjacent the upper end of the container 10. A tube 28 communicates with the interior of the tube 42 for the admission of gas and is connected to the tube 42 by means of threads 26 and 27.

The outer tube 42 is disposed concentrically around the tubes 40 and 41. A nut 19 having handles thereon threadably engages a flange 15 and clamps a washer 20 into a counterbore in the flange 15. The flange 15 is welded to the dispensing device 1 at 16 so that when the nut 19 is tightened, the washer 20 sealingly engages the outer periphery of the tube 42.

The dispensing device 1 is attached to the container 10 by means of a bayonet type connection of the type ordinarily used on beer barrels shown having the handle 100 and attached to the lower end of the dispensing device 1 so that the dispensing device 1 can be attached to the container 10 by means of the standard bayonet connection on the bung 5.

The piping arrangement is shown in Fig. 3. The inlet 365 is connected to an air supply pipe 50 by means of a valve 51 and is connected to a $CO_2$ supply pipe 53 by means of a valve 54. $CO_2$ supply pipe 53 is connected to the tube 28 through a valve 57 and connected to the air supply pipe 50 through a valve 58. A valve 60 can be opened to let the gas from above the beverage flow through the tube 42 and out to the ambient atmosphere so that the gas above the beverage can be changed from $CO_2$ to air and vice versa at any time at the discretion of the operator to maintain proper balance of dissolved $CO_2$ in the beverage.

The operator will connect a dispensing faucet to the valve 34 and connect the pipe 50 to an air supply and the pipe 53 to a $CO_2$ supply. He will then admit a mixture of air through the tube 42 and $CO_2$ through the tube 41 to the space above the beverage by opening the valves 54 and 51. Then if the beverage stands for an extended period of time, the dissolved gas in the beverage will escape so that the operator may replenish it by opening the valve 57 and allowing $CO_2$ to flow through the tube 41 and bubble up through the bottom of the beverage to the top. If the operator is serving beverage rather rapidly and does not want to recarbonate it rapidly but must add gas above the beverage to maintain pressure for dispensing, he will introduce $CO_2$ from the pipe 53 through the valve 57 and the tube 28 where it will mix with the air above the beverage. If he wishes to add $CO_2$ more rapidly, he will open the valve 54 and allow the gas to enter through the inlet 365 and bubble up through the beverage.

If the operator finds that his beverage is becoming wild; that is, becoming overcarbonated, he may open the valve 60 and allow the $CO_2$ from above the beverage to escape. He will open the valve 51 and allow air to enter through the inlet 365 and bubble up through the beverage, thereby reducing the amount of entrained $CO_2$ in the beverage.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a beverage dispensing device and a container comprising a container, an opening in an upper portion of said container, two concentric pipes comprising an outer pipe and a beverage pipe extending into said container, and means to sealingly connect said outer pipe to said container around said opening, said beverage pipe terminating adjacent the bottom of said container and communicating with the inside of said container, said beverage pipe having a dispensing valve connected to the upper end thereof, said outer pipe being selectively connected outside said container to a source of compressed air and a source of gas, the space between said outer pipe and said beverage pipe being selectively connected to a source of compressed air and a source of gas under pressure, said outer pipe and said beverage pipe comprising means to selectively supply air or gas over the top of a beverage in said container whereby said air or said gas may be bubbled up through said beverage to form a pressure over the top of said beverage whereby said beverage is forced through said beverage pipe.

2. In combination, a beverage dispensing device and a container comprising a container, an opening in an upper portion of said container, two concentric hollow members comprising an outer tube and an inner tube extending into said container through said opening, means to sealingly connect the outside surface of said outer tube to said container around said opening, said outer tube terminating adjacent the upper portion of the interior of said container and communicating with the inside of said container, a beverage pipe terminating adjacent the bottom of said container, said beverage pipe having a dispensing means connected to the upper end thereof, said beverage pipe extending into said container and having an open end extending into beverage in said container, and means to selectively connect said outer tube to a source of compressed air and to a source of gas, said inner tube being selectively connected to said source of compressed air and said source of compressed gas, said outer tube and said inner tube comprising means to selectively supply air or gas over the top of said beverage in said container or an air or gas bubbled up through said beverage.

3. The device recited in claim 2 wherein said beverage pipe is disposed concentric to said inner and outer tubes.

4. In combination, a beverage dispensing device and a container comprising a container, an opening in an upper portion of said container, a beverage pipe extending into said container, said beverage pipe terminating adjacent the bottom of said container, said beverage pipe having a shut-off valve connected to the upper end thereof, and a flow passage in said device concentric with said beverage pipe, means to selectively connect said flow passage outside said container to a source of compressed air and a source of another gas whereby said air or said gas may be admitted over liquid to form a pressure over the top of said liquid whereby said liquid is forced through said beverage pipe, said means to selectively connect said flow passage comprising a first valve selectively connecting said source of compressed air to said flow passage, a second valve selectively connecting said source of compressed air through said container to the space over said liquid, a third valve selectively connecting said gas source to said flow passage, a fourth valve selectively connecting said gas source through said liquid to said space over said liquid, and a fifth valve selectively connecting said space over said liquid to the ambient atmosphere.

References Cited in the file of this patent

UNITED STATES PATENTS 2,025,651    Dolan               Dec. 24, 1935

FOREIGN PATENTS 693,076    Great Britain         June 24, 1953